United States Patent
Menendez et al.

(10) Patent No.: US 11,347,712 B2
(45) Date of Patent: May 31, 2022

(54) PREVENTING LONG RUNNING TRANSACTIONS FROM HOLDING RECORD LOCKS

(71) Applicant: International Business Machines Corporation, Armonk, NY (US)

(72) Inventors: Terri A. Menendez, Richmond, MA (US); Roity Prieto Perez, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 383 days.

(21) Appl. No.: 15/806,120

(22) Filed: Nov. 7, 2017

(65) Prior Publication Data

US 2019/0138624 A1    May 9, 2019

(51) Int. Cl.
*G06F 16/23* (2019.01)
*G06F 16/176* (2019.01)

(52) U.S. Cl.
CPC ...... *G06F 16/2343* (2019.01); *G06F 16/1774* (2019.01)

(58) Field of Classification Search
CPC .................. G06F 16/2343; G06F 16/1774
See application file for complete search history.

(56) References Cited

U.S. PATENT DOCUMENTS

| | | | |
|---|---|---|---|
| 5,682,537 A | 10/1997 | Davies et al. | |
| 6,430,622 B1 | 8/2002 | Aiken, Jr. et al. | |
| 6,624,827 B1 | 9/2003 | Hwang et al. | |
| 6,965,961 B1 | 11/2005 | Scott | |
| 7,493,350 B2 | 2/2009 | Episale et al. | |
| 7,707,194 B2 | 4/2010 | Bresch et al. | |

(Continued)

FOREIGN PATENT DOCUMENTS

| CN | 101256509 A | 9/2008 |
|---|---|---|
| JP | H05046452 A | 2/1993 |

(Continued)

OTHER PUBLICATIONS

Nicola et al., "An XML Transaction Processing Benchmark," SIGMOD'07, ACM, Jun. 12-14, 2007, pp. 937-948.

(Continued)

*Primary Examiner* — Hosain T Alam
*Assistant Examiner* — Anthony G Gemignani
(74) *Attorney, Agent, or Firm* — Zilka-Kotab, P.C.

(57) ABSTRACT

In one embodiment, a method includes receiving, at a job control manager, a command specifying execution of a batch application. The method also includes receiving, at the job control manager, a commit count associated with the batch application, and initiating the batch application, with the batch application processing a group of records. The method also includes locking a first record of the group of records in response to the first record being processed by the batch application with the proviso that the batch application does not cause the first record to be unlocked unless the batch application has finished processing a last record in the group of records. Moreover, the method includes committing, in response to the batch application having completed processing of an nth record of the group of records, all records of the group of records that are locked resulting from execution of the batch application.

19 Claims, 5 Drawing Sheets

(56) References Cited

U.S. PATENT DOCUMENTS

| | | | |
|---|---|---|---|
| 7,882,062 B2 | 2/2011 | Holenstein et al. | |
| 7,962,615 B1 | 6/2011 | Lehr et al. | |
| 7,992,148 B2 | 8/2011 | Collins et al. | |
| 2002/0099703 A1* | 7/2002 | Whang | G06F 16/2343 |
| 2004/0093469 A1 | 5/2004 | Glasco | |
| 2004/0199734 A1* | 10/2004 | Rajamani | G06F 9/524 |
| | | | 711/163 |
| 2004/0210899 A1 | 10/2004 | Somogyi | |
| 2006/0253856 A1 | 11/2006 | Hu et al. | |
| 2008/0120618 A1 | 5/2008 | Collins et al. | |
| 2011/0197022 A1* | 8/2011 | Green | G06F 3/0607 |
| | | | 711/112 |
| 2012/0005680 A1* | 1/2012 | Dolby | G06F 11/1474 |
| | | | 718/101 |
| 2012/0284722 A1* | 11/2012 | Antani | G06F 9/466 |
| | | | 718/101 |
| 2014/0115215 A1 | 4/2014 | Jacobs et al. | |
| 2014/0181342 A1 | 6/2014 | Antonopoulos et al. | |
| 2014/0189693 A1 | 7/2014 | Trumbull et al. | |
| 2017/0039234 A1 | 2/2017 | Wagle | |
| 2017/0206240 A1* | 7/2017 | Vermeulen | G06F 16/2365 |
| 2017/0212846 A1 | 7/2017 | Menendez et al. | |
| 2017/0269974 A1* | 9/2017 | Arora | G06F 16/2343 |

FOREIGN PATENT DOCUMENTS

| | | |
|---|---|---|
| JP | H10143410 A | 5/1998 |
| JP | 2017520844 A | 7/2017 |
| JP | 2021501936 A | 1/2021 |
| KR | 20170013991 A | 2/2017 |
| WO | 2004095279 A1 | 11/2004 |
| WO | WO-2015087237 A1 * | 6/2015 ......... G06F 16/2365 |

OTHER PUBLICATIONS

Maheshwari et al., "How to Build a Trusted Database System on Untrusted Storage," Proceedings of the 4th conference on Symposium on Operating System Design & Implementation, vol. 4, USENIX Association, 2000, pp. 1-16.

Kuehn et al., "Transaction Specification in Multidatabase Systems Based on Parallel Logic programming," IMS'91, IEEE, 1991, pp. 110-117.

Trainer et al., "Bridging the Gap between Technical and Social Dependencies with Ariadne," Proceedings of the 2005 OOPSLA workshop on Eclipse technology exchange, ACM, 2005, pp. 1-5.

Kathuria et al., "Transaction Isolation and Lazy Commit," Data Engineering, ICDE 2007, IEEE, 2007, pp. 1204-1211.

Peri et al., "Correctness of concurrent executions of closed nested transactions in transactional memory systems," Theoretical Computer Science, vol. 496, 2013, pp. 125-153.

Menendez et al., U.S. Appl. No. 15/004,787, filed Jan. 22, 2016.

Non-Final Office Action from U.S. Appl. No. 15/004,787, dated Aug. 3, 2017.

Scott et al., "Scalable Queue-Based Spin Locks with Timeout," Symposium on Principles and Practice of Parallel Programming, Jun. 18-20, 2001, pp. 44-52.

International Search Report and Written Opinion from PCT Application No. PCT/IB2018/058622, dated Jan. 9, 2019.

Notice of Reasons for Rejection Translation from Japanese Application No. 2020-523750, dated Sep. 28, 2021.

Examination Report from European Application No. GB2007510.7, dated Dec. 21, 2021.

\* cited by examiner

PREVENTING LONG RUNNING TRANSACTIONS FROM HOLDING RECORD LOCKS

BACKGROUND

The present invention relates to record lock management, and more particularly, to preventing long running transactions from holding record locks for extended periods of time that affect other transactions.

Within a data system, records are stored to computer readable media and may be accessed by one or more users of the data system. Each time a record is accessed, a record lock is issued that prevents other users from accessing the same record. These record locks on individual records may be held until explicitly released. A batch job that accesses many different records may hold record locks for an extended period of time, which may cause time outs to other transactions that are waiting for the underlying records associated with the record locks and/or other record lock resources. This problem is especially evident in a transactional data environment which utilizes records which track transactions, such as financial records, bookkeeping records, etc.

In a transactional data environment, record locks are held until an explicit synchronization (sync) point (commonly referred to as a commit or backout) is issued by the batch application which requested the record locks, or until an implicit sync point is issued at an end of the batch application, referred to as end of task (EOT). If a batch application using transactional data manipulation does not include commit points, the entire batch job would be considered as one transaction and the record locks for the records accessed by the batch application will only be released at EOT. This has the potential to cause timeouts to possibly more important transactions that are waiting for these record lock resources in the system.

SUMMARY

In one embodiment, a method includes receiving, at a job control manager of a data system, a command specifying execution of a batch application. The method also includes receiving, at the job control manager, a commit count associated with the batch application. In addition, the method includes initiating the batch application, with the batch application processing a group of records. The method also includes locking a first record of the group of records in response to the first record being processed by the batch application with the proviso that the batch application does not cause the first record to be unlocked unless the batch application has finished processing a last record in the group of records. Moreover, the method includes committing, in response to the batch application having completed processing of an nth record of the group of records, all records of the group of records that are locked resulting from execution of the batch application. In this embodiment, n is equal to the commit count.

In another embodiment, a computer program product includes a computer readable storage medium having program instructions embodied therewith. The computer readable storage medium is not a transitory signal per se, and the embodied program instructions are executable by a processing circuit to cause the processing circuit to receive, by the processing circuit at a job control manager of a data system, a command specifying execution of a batch application. Further, the program instructions are executable to cause the processing circuit to receive, by the processing circuit at the job control manager, a commit count associated with the batch application. Also, the program instructions are executable to cause the processing circuit to initiate, by the processing circuit, the batch application, with the batch application processing a group of records. In addition, the program instructions are executable to cause the processing circuit to lock, by the processing circuit, a first record of the group of records in response to the first record being processed by the batch application with the proviso that the batch application does not cause the first record to be unlocked unless the batch application has finished processing a last record in the group of records. Moreover, the program instructions are executable to cause the processing circuit to commit, by the processing circuit and in response to the batch application having completed processing of an nth record of the group of records, all records of the group of records that are locked resulting from execution of the batch application. In this embodiment, n is equal to the commit count.

In yet another embodiment, a system includes a processing circuit, a memory, and logic stored to the memory, that when executed by the processing circuit causes the processing circuit to receive, at a job control manager of a data system, a command specifying execution of a batch application. The logic also causes the processing circuit to receive, at the job control manager, a commit count associated with the batch application and initiate the batch application, with the batch application processing a group of records. In addition, the logic causes the processing circuit to lock a first record of the group of records in response to the first record being processed by the batch application with the proviso that the batch application does not cause the first record to be unlocked unless the batch application has finished processing a last record in the group of records. Moreover, the logic causes the processing circuit to commit, in response to the batch application having completed processing of an nth record of the group of records, all records of the group of records that are locked resulting from execution of the batch application. In this embodiment, n is equal to the commit count.

Other aspects and embodiments of the present invention will become apparent from the following detailed description, which, when taken in conjunction with the drawings, illustrate by way of example the principles of the invention.

DETAILED DESCRIPTION

Figure 1A:
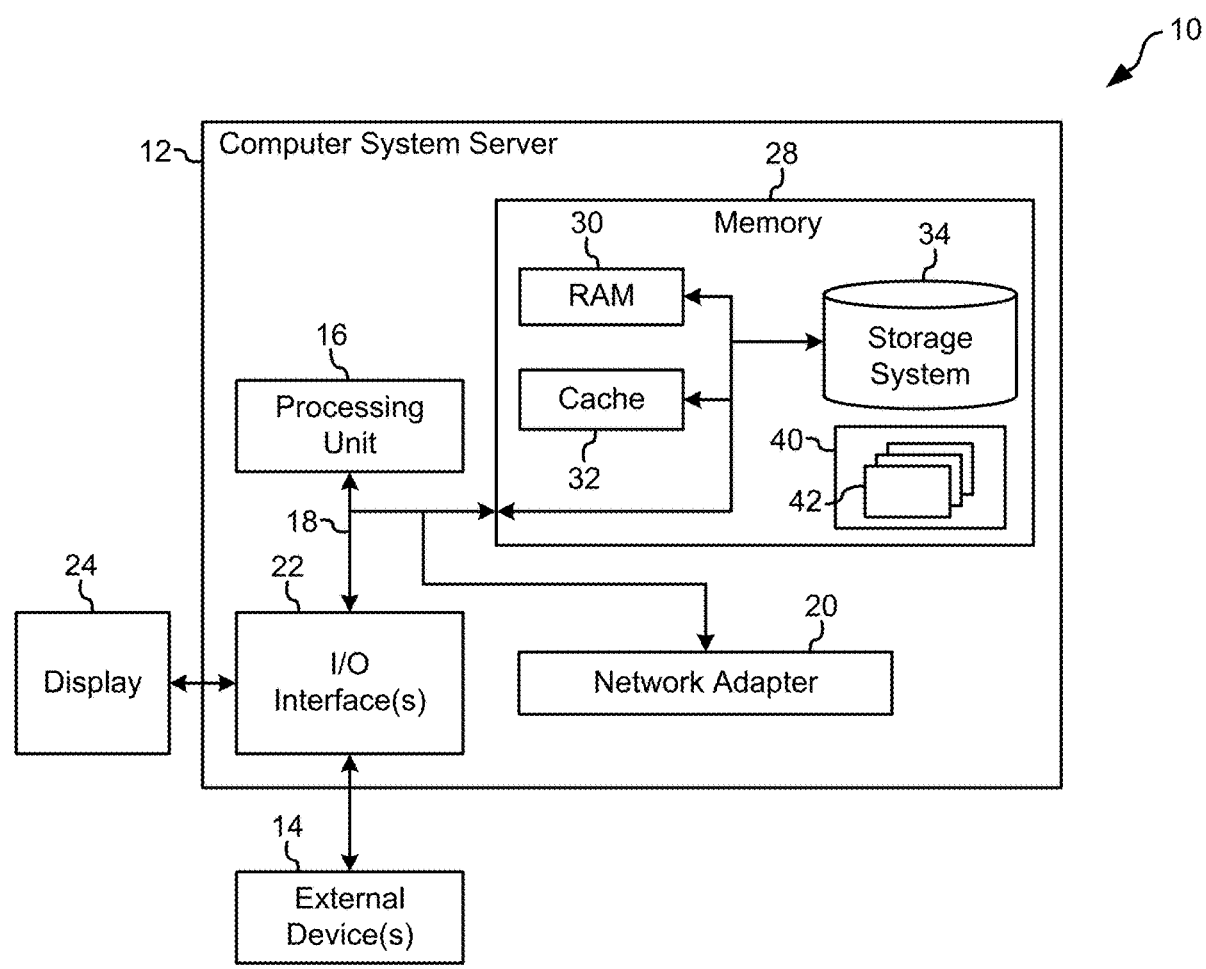
FIG. 1A depicts a computing node according to an embodiment of the invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "about" as used herein indicates the value preceded by the term "about," along with any values reasonably close to the value preceded by the term "about," as would be understood by one of skill in the art. When not indicated otherwise, the term "about" denotes the value preceded by the term "about" ±10% of the value. For example, "about 10" indicates all values from and including 9.0 to 11.0.

The following description discloses several preferred embodiments of systems, methods, and computer program products for preventing long running transactions from holding record locks.

In one general embodiment, a method includes receiving, at a job control manager of a data system, a command specifying execution of a batch application. The method also includes receiving, at the job control manager, a commit count associated with the batch application. In addition, the method includes initiating the batch application, with the batch application processing a group of records. The method also includes locking a first record of the group of records in response to the first record being processed by the batch application with the proviso that the batch application does not cause the first record to be unlocked unless the batch application has finished processing a last record in the group of records. Moreover, the method includes committing, in response to the batch application having completed processing of an nth record of the group of records, all records of the group of records that are locked resulting from execution of the batch application. In this embodiment, n is equal to the commit count.

In another general embodiment, a computer program product includes a computer readable storage medium having program instructions embodied therewith. The computer readable storage medium is not a transitory signal per se, and the embodied program instructions are executable by a processing circuit to cause the processing circuit to receive, by the processing circuit at a job control manager of a data system, a command specifying execution of a batch application. Further, the program instructions are executable to cause the processing circuit to receive, by the processing circuit at the job control manager, a commit count associated with the batch application. Also, the program instructions are executable to cause the processing circuit to initiate, by the processing circuit, the batch application, with the batch application processing a group of records. In addition, the program instructions are executable to cause the processing circuit to lock, by the processing circuit, a first record of the group of records in response to the first record being processed by the batch application with the proviso that the batch application does not cause the first record to be unlocked unless the batch application has finished processing a last record in the group of records. Moreover, the program instructions are executable to cause the processing circuit to commit, by the processing circuit and in response to the batch application having completed processing of an nth record of the group of records, all records of the group of records that are locked resulting from execution of the batch application. In this embodiment, n is equal to the commit count.

In yet another general embodiment, a system includes a processing circuit, a memory, and logic stored to the memory, that when executed by the processing circuit causes the processing circuit to receive, at a job control manager of a data system, a command specifying execution of a batch application. The logic also causes the processing circuit to receive, at the job control manager, a commit count associated with the batch application and initiate the batch application, with the batch application processing a group of records. In addition, the logic causes the processing circuit to lock a first record of the group of records in response to the first record being processed by the batch application with the proviso that the batch application does not cause the first record to be unlocked unless the batch application has finished processing a last record in the group of records. Moreover, the logic causes the processing circuit to commit, in response to the batch application having completed processing of an nth record of the group of records, all records of the group of records that are locked resulting from execution of the batch application. In this embodiment, n is equal to the commit count.

Referring to FIG. 1A, a schematic of an example of a computing node 10 is shown in accordance with one embodiment. The computing node 10 is only one example of a suitable computing node and is not intended to suggest any limitation as to the scope of use or functionality of embodiments of the invention described herein. Regardless, computing node 10 is capable of being implemented and/or performing any of the functionality set forth herein. Moreover, computing node 10 may be included in any system, network, cloud, cluster, and/or data storage environment as described herein and/or known to those of skill in the art.

In the computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held devices, laptop devices, multiprocessor systems, microprocessor-based systems, set top boxes, programmable consumer electronics, network personal computers (PCs), minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1A, computer system/server 12 in the computing node 10 is shown in the form of a general-purpose computing device. The components of computer system/server 12 may include, but are not limited to, one or more processors, processing circuits, and/or processing units (collectively, processor 16), a system memory 28, and a bus 18 that couples various system components including system memory 28 to the processor 16.

Bus 18 represents one or more of any of several types of bus structures, including a memory bus, a memory controller, a peripheral bus, an accelerated graphics port, a processor, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer readable storage media. Such media may be any available media that is accessible by computer system/server 12, and it includes both volatile and non-volatile media, removable and non-removable media, etc.

System memory 28 may include computer readable storage media in the form of volatile memory, such as random access memory (RAM) 30 and/or cache memory 32. Computer system/server 12 may further include other removable/non-removable, volatile/non-volatile computer readable storage media. By way of example only, storage system 34 may be provided for reading from and writing to a non-removable, non-volatile magnetic storage media (not shown and typically called a "hard drive" or "solid state drive"). Although not shown, a magnetic disk drive for reading from and writing to a removable, non-volatile magnetic disk (e.g., a "floppy disk"), and an optical disk drive for reading from and/or writing to a removable, non-volatile optical disk such as a CD-ROM, DVD-ROM, and/or other optical media may be provided. In such instances, each may be connected to the bus 18 by one or more data media interfaces. As will be further depicted and described below, memory 28 may include at least one computer program product having a set (e.g., at least one) of program modules that are configured to carry out the functions described in embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication may occur via Input/Output (I/O) interfaces 22. Still yet, computer system/server 12 may communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, redundant array of independent disks (RAID) systems, tape drives, data archival storage systems, etc.

The computer system/server 12 may have resident thereon an operating system such as the Microsoft Windows® Operating System (OS), an Apple® OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 1B:
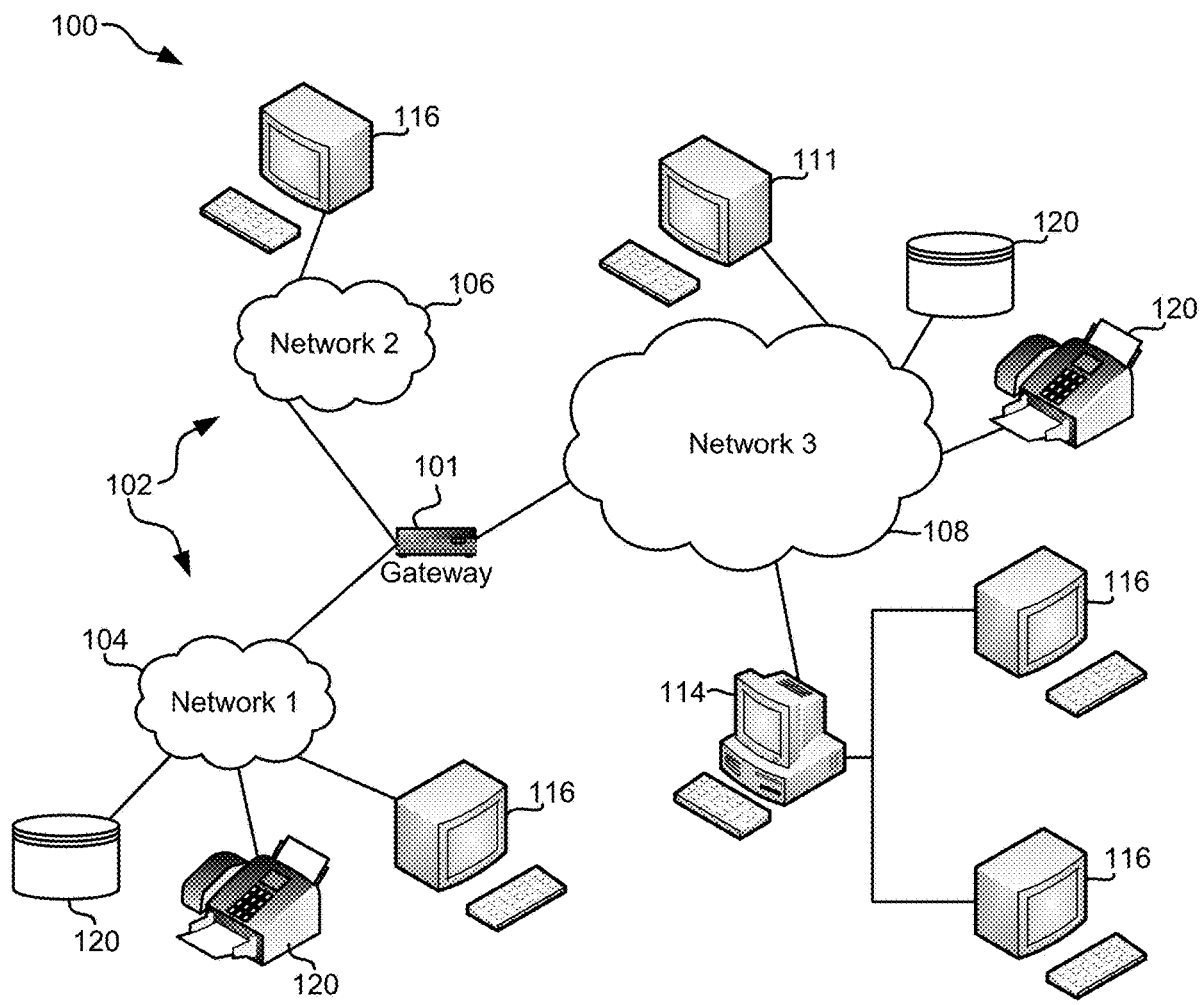
FIG. 1B illustrates a network architecture, in accordance with one embodiment.

FIG. 1B illustrates an architecture 100, in accordance with one embodiment. Computing node 10 shown in FIG. 1A may be utilized in the architecture 100 as shown in FIG. 1B. Moreover, the architecture 100 may include a plurality of remote networks 102 including a first remote network 104 and a second remote network 106. A gateway 101 may be coupled between the remote networks 102 and a proximate network 108. In the context of the present architecture 100, the networks 104, 106 may each take any form including, but not limited to, a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, laptop computer, hand-held computer, printer, and/or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software or some other known virtualization layer, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
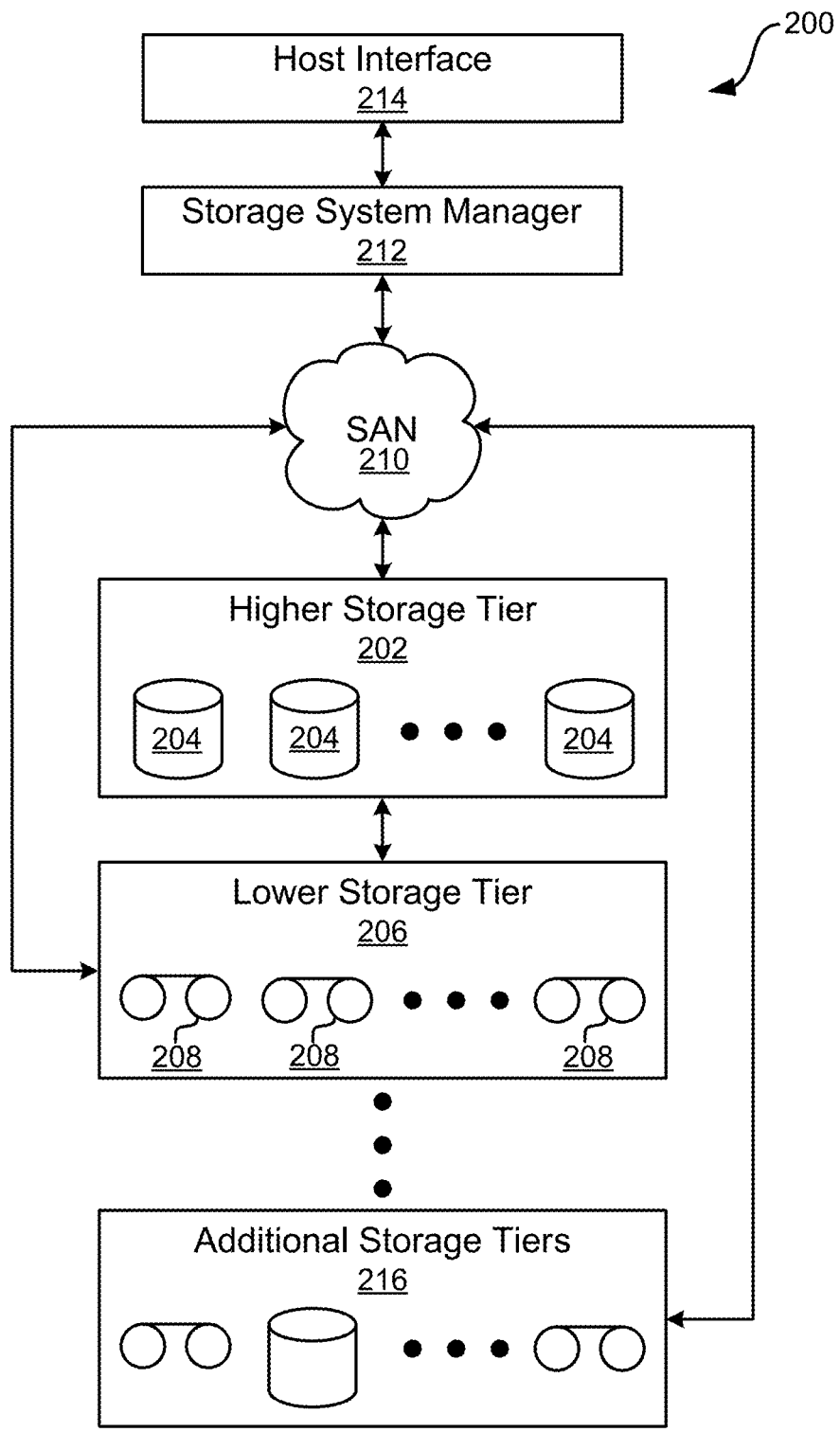
FIG. 2 illustrates a tiered data storage system in accordance with one embodiment.

Now referring to FIG. 2, a tiered storage system 200 is shown according to one embodiment. Note that some of the elements shown in FIG. 2 may be implemented as hardware and/or software, according to various embodiments. The storage system 200 may include a storage system manager 212 for communicating with a plurality of media on at least one higher storage tier 202 and at least one lower storage tier 206. The storage system manager may also include a job control manager for managing job requests, as described in more detail herein according to various embodiments. The higher storage tier(s) 202 preferably may include one or more random access and/or direct access media 204, such as nonvolatile memory (NVM), solid state memory in solid state drives (SSDs), flash memory, SSD arrays, flash memory arrays, hard disks in hard disk drives (HDDs), etc., and/or others noted herein or known in the art. The lower storage tier(s) 206 may preferably include one or more lower performing storage media 208, including slower accessing HDDs, sequential access media such as magnetic tape in tape drives and/or optical media, etc., and/or others noted herein or known in the art. One or more additional storage tiers 216 may include any combination of storage memory media as desired by a designer of the system 200. Also, any of the higher storage tiers 202 and/or the lower storage tiers 206 may include some combination of storage devices and/or storage media.

The storage system manager 212 may communicate with the storage media 204, 208 on the higher storage tier(s) 202 and lower storage tier(s) 206 through a network 210, such as a storage area network (SAN), as shown in FIG. 2, or some other suitable network type. The storage system manager 212 may also communicate with one or more host systems (not shown) through a host interface 214, which may or may not be a part of the storage system manager 212. The storage system manager 212 and/or any other component of the storage system 200 may be implemented in hardware and/or software, and may make use of a processor (not shown) of a type known in the art, such as a central processing unit (CPU), a field programmable gate array (FPGA), an application specific integrated circuit (ASIC), etc., for executing commands. Of course, any arrangement of a storage system may be used, as will be apparent to those of skill in the art upon reading the present description.

In more embodiments, the storage system 200 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 202, may include a majority of SSD storage media (up to and including all SSD storage media) for storing data in a higher performing storage environment, and remaining storage tiers, including lower storage tier 206 and additional storage tiers 216 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 202, while data not having one of these attributes may be stored to the additional storage tiers 216, including lower storage tier 206. Of course, one of skill in the art, upon reading the present descriptions, may devise many other combinations of storage media types to implement into different storage schemes, according to the embodiments presented herein.

In one particular embodiment, the storage system 200 may include a combination of SSDs and HDDs, with the higher storage tier 202 including SSDs (and possibly some buffer memory) and the lower storage tier 206 including HDDs (and possibly some buffer memory). According to another embodiment, the storage system 200 may include a combination of SSDs and magnetic tape with magnetic tape drives, with the higher storage tier 202 including SSDs (and possibly some buffer memory) and the lower storage tier 206 including magnetic tape (and possibly some buffer memory) and magnetic tape drives for accessing data from the magnetic tapes. In yet another embodiment, the storage system 200 may include a combination of HDDs and magnetic tape, with the higher storage tier 202 including HDDs (and possibly some buffer memory) and the lower storage tier 206 including magnetic tape (and possibly some buffer memory).

Figure 3:
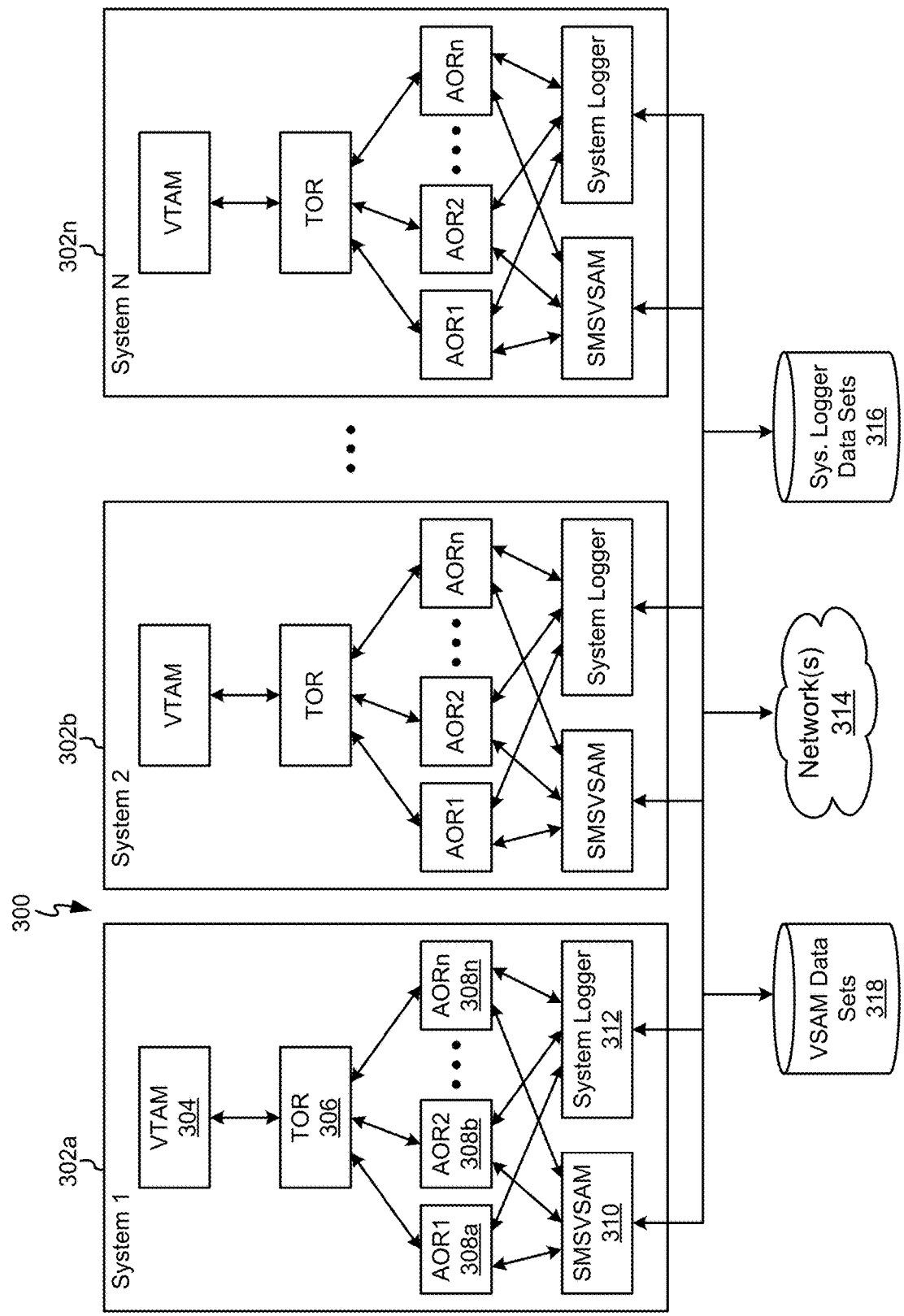
FIG. 3 shows a parallel computing system, according to one embodiment.

With reference to FIG. 3, a parallel computing system (sysplex) 300 is shown that includes more than one system 302, e.g., System 1 302a, System 2 302b, . . . , System N 302n. Each system includes a number of components. As shown in FIG. 3, System 1 302a includes a virtual telecommunications access method (VTAM) engine 304 which is a set of programs that maintain control of communications between terminals and application programs, and may be referred to as a job control manager. System 1 302a also includes a terminal owning region (TOR) 306, which is a customer information control system (CICS) region devoted to managing the terminal network, and a plurality of application owning regions (AORs) 308, e.g., AOR1 308a, AOR2 308b, . . . , AORn 308n. Each AOR 308 is devoted to providing space for an application to operate and utilize resources of the system. The AORs 308 are coupled to a data-sharing subsystem of the storage management subsystem (SMSVSAM) 310 and a system logger 312. These components are coupled to a plurality of virtual storage access method (VSAM) data sets 318, one or more networks 314, and a plurality of system logger data sets 316.

This parallel sysplex 300 may be used to provide Record Level Sharing (RLS) data access that allows multisystem access to a VSAM data set while ensuring cross-system locking and buffer invalidation. RLS uses cross-system extended services (XES) to perform data set level locking, record locking, and data caching. RLS maintains data coherency at the control interval level. It uses coupling facility (CF) caches as store-through caches. In response to a control interval of data being written, it is written to both the CF cache and to a direct access storage device (DASD). This ensures that a failure in the CF cache does not result in the loss of VSAM data. Of course, in some embodiments, a single system, such as System 1 302a, may be utilized to provide access to the VSAM data sets 318.

Figure 4:
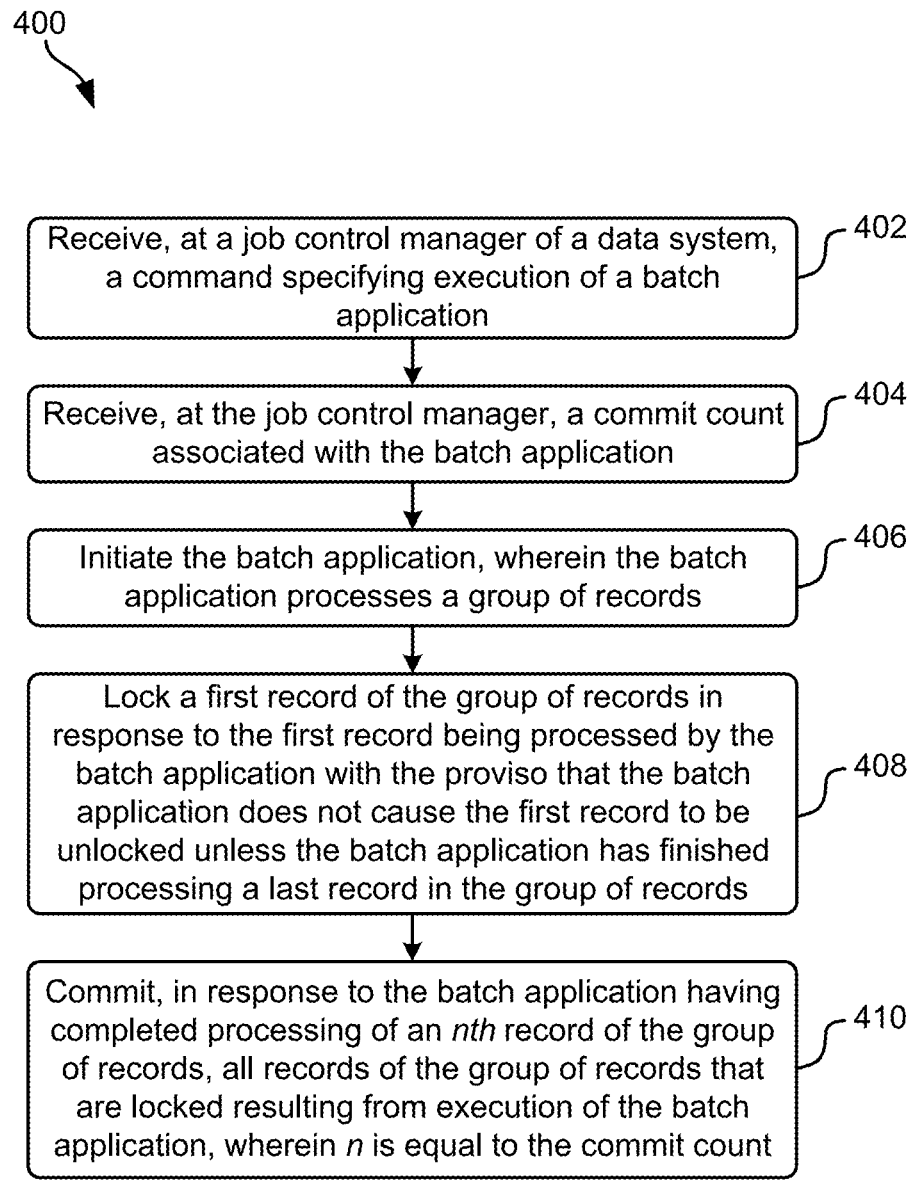
FIG. 4 shows a flowchart of a method, according to one embodiment.

Now referring to FIG. 4, a method 400 is shown according to one embodiment. The method 400 may be performed in accordance with the present invention in any of the environments depicted in FIGS. 1A, 1B, 2, and 3 among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a microprocessor, a server, a mainframe computer, a processing circuit having one or more processors therein, or some other device comprising one or more processors. The processing circuit, e.g., processor(s), chip(s), and/or module(s) implemented in hardware and/or software, and preferably having at least one hardware component, may be utilized in any device to perform one or more steps of the method 400. Illustrative processors include, but are not limited to, a MPU, a CPU, an ASIC, a FPGA, etc., combinations thereof, or any other suitable computing device known in the art.

In one embodiment, the operating environment may include a data system that may be one of a cluster of additional systems within the environment (e.g., a sysplex, etc.). In another embodiment, the data system may include a server, a personal computer, a mobile device, or any device capable of running the first process. In yet another embodiment, the data system may be included within a virtual storage environment. For example, the data system may be part of a VSAM environment.

As shown in FIG. 4, method 400 may start with operation 402, where a command specifying execution of a batch application is received at a job control manager of a data system. The command may have any format and may be of any type known in the art. Moreover, the command may be forwarded to the job control manager from one or more intermediary devices, physical or virtual, other than a device which initiated the execution of the batch application.

The job control manager is capable of and configured to control job requests received by the job control manager using various resources of the data system. The job control manager may be of any type known in the art. In various approaches, the job control manager may assign resources of the data system to process received job requests, prioritize job execution within the finite resources of the data system, and sort through received job requests to determine a next job to execute to optimize use of the resources and/or adhere to job control specifications set by one or more system administrators and/or specific to a requested job. The job control manager may utilize one or more queues for storing received job requests in some approaches.

The batch application may be of any type, size, structure, and format as would be known by one of skill in the art and is compatible with the data system and devices operating therein. For example, the batch application may request access to and/or process one or more records that are stored in the data system on one or more computer readable storage media, such as RAM, ROM, a HDD, a SSD, etc. Accessing a particular record includes reading, writing, modifying, deleting, moving, and/or otherwise manipulating the particular record as is known in the art.

In operation 404, a commit count associated with the batch application is received at the job control manager. The commit count may be a single value or more than one value. In either case, the commit count indicates a number of records to process by the batch application prior to committing the records (e.g., releasing all record locks associated with the processed records).

In one embodiment, the commit count may be a single value that expresses a minimum number of records to process prior to committing associated record locks. For example, the commit count as a minimum value may have a value of 1, 10, 100, 200, 500, 1000, etc., and may be based on an amount of time that transpires in order to process this many records. The commit count as a minimum value indicates that at least this many records (equal to the commit count) are processed (and possibly more) prior to committing record locks associated therewith that may still be outstanding after processing of records has completed.

In another embodiment, the commit count may be a single value that expresses a maximum number of records to process prior to committing associated record locks. For example, the commit count as a maximum value may have a value of 5, 10, 100, 200, 500, 1000, etc., and may be based on an amount of time that transpires in order to process this many records. The commit count as a maximum value indicates that at most this many records (equal to the commit count) are processed (but possibly less) prior to committing record locks associated therewith that may still be outstanding after processing of records has completed.

According to another embodiment, the commit count may include multiple values, e.g., a minimum value and a maximum value, that express both the minimum and maximum number of records to process prior to committing associated record locks. For example, the commit count as a minimum or maximum value may have a value of 1, 5, 10, 100, 200, 500, 1000, etc., with the minimum value being less than or equal to the maximum value. In this embodiment, the commit count acts as a range, such that record locks may be committed at any point within the range between (and including) the minimum and maximum values. Moreover, the actual values that are selected for the minimum and maximum values may be based on an amount of time that transpires in order to process records. In addition, when the minimum value is the same as the maximum value, then record locks are committed when this exact number of records are processed.

As described above, in method 400, the commit count may include two values: a minimum number of records to be processed prior to a commit and a maximum number of records to be processed prior to the commit. In this approach, a quantity of record lock requests that are pending execution due to the batch application processing the group of records is not tracked in response to a determination that the minimum number of records to be processed prior to the commit is equal to the maximum number of records to be processed prior to the commit, which indicates a single value for the minimum and maximum number of records to be processed, and after processing of this exact number of records, a commit is performed to release all associated record locks.

In operation 406, the batch application is initiated, either directly or indirectly by the job control manager. The batch application processes a group of records, with processing including accessing the records. In accordance with the access to records by the batch application, record locks are issued for records that are being processed, as is known in the art. The group of records may include any number of records, from one to several million, depending on capabilities of the system to handle processing of multiple records and the function and design of the batch application.

Additionally, in one embodiment, additional processing of records may be associated with one or more additional applications within the data system. For example, a first application of the data system may perform a first process on a first record within the data system, and a second application of the data system may perform a second process on a second record within the data system. In another embodiment, the first process may include one or more actions that are performed with respect to the first record. For example, the first process may edit the first record, remove the first record, create the first record, access the first record, etc. In yet another embodiment, the first process may be part of a larger group of processes. For example, the first process may be part of a batch of processes to be performed within the data system by the batch application. Also, in one embodiment, the first process may include a transactional process (e.g., a CICS transaction, etc.), a subsystem process, a batch process, etc.

Moreover, in one embodiment, each record of the group of records may include any data able to be accessed by the data system. In another embodiment, each record may be accessible by all subsystems and/or parallel systems of the data system. For example, the records may include shared data within the sysplex. In yet another embodiment, the record may include storage data (e.g., virtual storage data within a VSAM, etc.). In still another embodiment, the record may be stored within one or more of the systems of a sysplex, within a storage area separate from the other systems within the sysplex.

Any batch application known in the art may be initiated, such as batch applications that process financial records, bank records, personnel records, medical records, personal data records, social security and government records, etc. By initiating, what is meant is starting the batch application (e.g., executing the batch application) so that it may perform some or all of the functionality that is comprised within the code of the batch application.

In operation 408, a first record of the group of records is locked in response to the first record being processed by the batch application. Moreover, in operation 408, the batch application does not cause the first record to be unlocked unless and until the batch application has finished processing a last record in the group of records. By last record, what is meant is that all other records in the group of records have been processed beside the record which is referred to as the last record. This processing may occur chronologically, according to a queuing scheme such as first-in-first-out (FIFO), first-in-last-out (FILO), by size (smallest to largest, largest to smallest), alphabetically according to record name or some other attribute of the records, or in a random order.

Furthermore, additional records may be locked in response to these additional records being processed by the batch application. This record locking process may continue as long as the batch application accesses additional records of the group of records. However, once all of the group of records have been processed by the batch application, no more record locks are anticipated to be generated based on processing of records by the batch application.

In this embodiment, the lock for the first record may include an access lock. For example, the lock for the first record may provide the batch application with exclusive access to the first record within the data system and any parallel systems or subsystems thereof. In another example, the lock for the first record may prevent any process other than a process of the batch application from accessing the first record. In another embodiment, the lock for the first record may be held by the batch application for a predetermined time. In still another embodiment, the lock for the first record may be held by the batch application until one or more predetermined criteria are met. For example, the lock for the first record may be held by the batch application until a command is issued by the batch application to release the lock after processing is complete.

In operation 410, in response to the batch application having completed processing of an nth record of the group of records, all records of the group of records that are locked resulting from execution of the batch application are committed. By committed, what is meant is that updates and changes that result from the batch application processing are made to the one or more affected records, and all record locks issued based on the processing of the batch application are released, such that another process is allowed to access the record(s). In one embodiment, n is equal to the commit count and is a positive integer that indicates a number of records to process by the batch application prior to committing the record locks associated with the group of records.

For example, in operation 410, assuming that n is equal to 100, the batch application will process 100 records, and in response to completing processing of the $100^{th}$ record, any and all records of the group of records that are locked resulting from execution of the batch application are committed, thereby releasing these record lock(s).

According to one embodiment, method 400 may include discovering the existence and tracking a quantity of record lock requests that are pending execution due to the batch application processing the group of records. In this description, the term "record lock requests," also referred to as "waiters," includes record access requests and any other requests for access to a resource which will result in issuance of a record lock on one or more specific records, with these record locks pending and unable to be fulfilled due to contention with the record lock held by the batch application. That is, existence of and a number of pending record lock requests are tracked, with this value being stored to a computer readable storage medium in one approach that is accessible to the job control manager.

These pending record lock requests are issued by one or more devices (physical or virtual device(s) that is/are different from the job control manager as it executes method 400) to lock at least one record and/or access at least one record that is already locked due to execution of the batch application, and therefore are pending and have not been fulfilled. The job control manager may also issue record lock requests that become pending (waiters) because they have not been fulfilled due to execution of the batch application, but these pending record lock requests may be issued for the benefit of another application other than the batch application of method 400.

Moreover, each waiter may have a timeout value associated therewith which dictates when the pending record lock request will expire if the record lock is not processed prior to the timeout value. In one embodiment, a timeout value associated with each waiter is also determined by the job control manager, so that the job control manager is able to determine when each record lock request will expire.

This tracking of waiters allows for the job control manager to determine an effect of the execution of the batch application on other requests to access records of the group of records that may be put on hold, indefinitely, during the execution of the batch application. This may cause serious delays in the execution of another application and/or process that may have a greater priority than the batch application, and therefore should be processed more expediently than the batch application of method 400.

Further still, in one embodiment, a plurality of record lock requests may be enqueued within a queue. For example, a first request for the lock of the first record may be identified within a global wait queue of the data system that contains a plurality of different requests for locks of records that are currently being held by other processes. In another embodiment, the first request for the lock of the first record may be one of a plurality of requests for the lock of the first record within the queue. For example, a second process may be one of a plurality of processes within the queue that are waiting for the lock of the first record held by the batch application.

In a further approach, method 400 may also include committing any and all records of the group of records that are locked resulting from execution of the batch application in response to the batch application having completed processing of at least a minimum number of records of the group of records and a determination that the quantity of record lock requests (waiters) exceeds a threshold. In one approach, the minimum number of records is less than the commit count, resulting in a technique that allows for early committing (prior to processing an amount of records equal to the commit count) to deal with the record lock requests that are pending.

In one embodiment, the threshold of pending record lock requests may be one record lock request. In alternate embodiments, the threshold of pending record lock requests may be 2, 4, 5, 10, 20, 50, 100, or more pending record lock requests. This threshold may be set by an administrator of the data system explicitly. Moreover, this threshold may be set individually for the batch application, such that a different threshold may be set for any other applications that are executed within the system.

According to another embodiment, method 400 may include determining an amount of time that elapses from initiating the batch application to committing all records of the group of records that are locked resulting from execution of the batch application. This operation may be carried out in response to the nth record of the group of records being processed alone or in combination with a determination that no pending record locks are discovered for any records in the group of records after initiating the batch application (e.g., no waiters being discovered or otherwise tracked after initiation of the batch application).

In another embodiment, method 400 may include receiving, at the job control manager, a second command specifying execution of a second batch application. This second batch application may adhere to the same set of rules and policies as the batch application initiated in operation 406, or may adhere to a different set of rules and policies specific to the second batch application that may overlap with the rules and policies governing the execution of the batch application initiated in operation 406 in some approaches. In one embodiment, the second batch application may be the same as the batch application initiated in operation 406.

Method 400 may also include initiating, directly or indirectly, the second batch application that processes a second group of records which may overlap partially or completely with the first set of records, or may be distinct from the first set of records. Moreover, method 400 may include locking one or more records of the second group of records in response to the one or more records being processed by the second batch application and tracking a quantity of record lock requests that are pending execution due to the batch application processing the second group of records (waiters for the second group of records). This locking of records is performed such that the second batch application does not cause the one or more records to be unlocked unless and until the second batch application has finished processing a last record in the second group of records.

In addition, method 400 may include committing, any and all records of the second group of records that are locked resulting from execution of the second batch application in response to the batch application having completed processing of an mth record of the second group of records and a determination that the quantity of record lock requests will be processed prior to a shortest timeout thereof after completing the processing of the mth record of the second group of records. Accordingly, a timeout value for each record lock request may also be determined and/or received. This commit is performed after completing the processing of the mth record of the second group of records. Moreover, in one approach, m may be equal to the commit count.

However, in an alternate approach, method 400 may include committing all records of the second group of records that are locked resulting from execution of the second batch application prior to completing the processing of the mth record of the second group of records. This commit may be performed in response to a determination that the quantity of record lock requests will not be processed prior to the shortest timeout thereof after completing the processing of the mth record of the second group of records.

These determinations are based on timeout values associated with each pending record lock request. Therefore, the timeouts for all pending record lock requests are compared, and a timeout that will occur the soonest or in the least amount of time is selected as the shortest timeout. With this timeout selected as the shortest timeout, it can be ensured that if the record lock request with the shortest timeout will be able to be processed without timing out (after the processing of the mth record of the second group of records), then all pending record lock requests will be able to be processed without timing out. Otherwise, the processing of the second group of records is disrupted after processing the minimum number of records in order to ensure that none of the pending record lock requests will timeout.

Method 400 may be implemented in a system and/or a computer program product. For example, a system may include a processing circuit and logic integrated with the processing circuit, executable by the processing circuit, or integrated with and executable by the processing circuit. By integrated with, what is meant is that the processing circuit is a hardware processor that has hardcoded logic included therewith, such as an ASIC, a FPGA, etc. By executable by, what is meant is that the processor is configured to execute software logic to achieve functionality dictated by the software logic, with the processor possibly being a MPU, a CPU, a microprocessor, etc. The logic is configured to cause the processing circuit to perform method 400.

In another example, a computer program product may include a computer readable storage medium having program instructions embodied therewith. The computer readable storage medium may be any suitable storage device known in the art that is configured to store and allow computer access to information stored therein. The embodied program instructions are executable by a processing circuit to cause the processing circuit to perform method 400.

When method 400 is performed with a data system that adheres to transactional VSAM, such as within an IBM z/OS environment, or any other system that utilizes transactional VSAM as would be known in the art, a new parameter may be added in the job step in the job control language (JCL) or some other suitable place, such as in the IGWSMSxx parameter library (paramlib) member, to enable a transactional VSAM engine to decide when to perform automatic commits. The transactional VSAM engine, as used herein, describes a software module, a library, a software development kit (SDK), and/or an object that includes an encapsulated block of functionality that executes VSAM transactional tasks. Any suitable engine may be used as would be known to one of skill in the art. In some embodiments, the transactional VSAM engine may also be referred to as a job control manager.

The new parameter may include one or more values, such as two values or three values. In one approach, the new parameter (commit count) may include a minimum value and a maximum value that specifies a range of values for record lock and record access requests. This commit count will be used by the transactional VSAM engine to determine when and if to issue a commit point on behalf of the records utilized by a batch application, such as by calling resource recovery services (RRS). The transactional VSAM engine may adjust the commit frequency (number of records accessed and/or record locks requested) to a value between the minimum and maximum values based on an analysis of the number of pending record locks (waiters) in the current transaction or unit of recovery (UR). Additionally, an administrator or some other user may specify a similar system level commit parameter in the initialization routine member for the storage management subsystem (IGDSMSxx) of sys1.paramlib. Moreover, the JCL value may override the values specified in IGDSMSxx.

In this example, transactional VSAM engine issues one or more commit synchronization points (syncpoints) on behalf of batch applications or jobs that use transactional VSAM. As described previously, a parameter is specified in the JCL execution statement or the IGDSMSxx member of sys1.parmlib to enable the transactional VSAM engine to determine when it should issue the commit sync point. For each UR or transaction that is enabled for automatic commits, the transactional VSAM engine may count the number of record access requests (add, erase, updates) as they are issued by the batch application. With the count of record access requests and the values specified by the parameter, transactional VSAM services (TVS) decides a point in time in which to perform automatic commits for the UR. The count is reset during a commit, immediately thereafter, or in the event of a backout syncpoint.

In one embodiment, the parameter that is used to specify the automatic commit frequency may be as follows:
//stepname EXEC positional-parm, TVSAMCOM= ({minval},{maxval})

In this exemplary parameter, the TVSAMCOM includes one or more values that dictate a number of records to process prior to committing the records. The minval parameter is an integer number (1-99999) that represents the minimum number of record access requests that are performed before the transactional VSAM engine issues an automatic commit on behalf of the batch application. Also, the maxval parameter is an integer number (0-99999) that represents the maximum number of record access requests that are performed before the transactional VSAM engine issues an automatic commit on behalf of the batch application. This value will take effect if, and only if, the transactional VSAM engine does not dynamically adjust the commit frequency (such as due to lock contention analysis) to a number lower than the maximum value specified by the maxval parameter.

According to one detailed implementation example, during initialization of the data-sharing subsystem (utilizing VSAM) of the storage management subsystem (SMSVSAM), the transactional VSAM engine retrieves the values from the storage management subsystem (SMS) and saves them in internal control blocks. The first "open" request of a data set for the UR also retrieves the minval and maxval values from the JCL execution statement and saves them in a control block associated with the open request. The first record management request that is issued for the UR sets the final minval and maxval values for the UR based on the values specified in the JCL execution statement and sys1.paramlib. The values specified in the JCL statement take priority over those in the IGDSMSxx.

In the event that the same value is specified for minval and maxval (minval=maxval && maxval>0), the transactional VSAM engine performs automatic commits after the specified number of record access requests issued by the batch application have been performed. In this case, the transactional VSAM engine does not adjust the commit frequency based on the number of waiters for record locks discovered or obtained by the UR in order to save resources.

According to a first example, assuming that TVSAM-COM=(100,100) DFSMSTVS will issue a commit on behalf of the application when the number of record accesses (processing of records) performed by the application reaches 100. If the value specified for minval is less than maxval (minval<maxval && maxval>0), the transactional VSAM engine will adjust the commit frequency to a number between minval and maxval. In this case, the transactional VSAM engine will perform record lock contention analysis for the UR by requesting waiter information for record locks held because of the UR. The remote systems will respond to the originating system with the CICS request that will timeout the soonest and with the time of day (TOD) the timeout will occur. Once the originating system receives a signal that all systems have responded to the contention request for a specific record lock, it will analyze all the responses, including those from itself. If no CICS jobs are waiting for the record lock, it means there is no contention and the transactional VSAM engine will issue a commit only when the number of records processed in the UR reaches the maxval value.

According to a second example, assuming that TVSAM-COM=(10,100), DFSMSTVS will issue a commit on behalf of the application when 100 records have been processed provided that there are no CICS waiters for any of the record locks held by the UR. If the returned information shows that there are CICS jobs waiting for at least one of the record locks, the transactional VSAM engine might commit before the 100 records are processed, but only after the minimum number of 10 records have been processed.

This adjustment of the commit frequency within the range specified by the minval and maxval may take into account several factors, alone or in combination. The transactional VSAM engine may determine a CICS waiting request that will timeout the soonest in the system, and then based on this timeout value, the transactional VSAM engine will calculate the specific time the waiting request will timeout. Thereafter, the transactional VSAM engine will verify whether the UR holding the record lock will be committed naturally (reach maxval) prior to the timeout being reached according to the following algorithm.

For each UR enabled for dynamic automatic commit, the transactional VSAM engine will keep an average of how long each micro-transaction takes, so that an average amount of time needed to complete the UR may be established. For example, if the user specifies a minval value of 10 and a maxval value of 100, and if there are no dynamic automatic commits that take place during processing of the batch application prior to achieving the processing of 100 records due to contention, the transactional VSAM engine will commit in response to 100 records being processed. The elapsed time to perform the processing of the 100 records is stored and an average time to process records up to the scheduled commit is calculated using this stored time and all previously achieved intervals. The transactional VSAM engine will use this calculated average time to process records up to the scheduled commit to identify whether a current UR should be committed early based on a time in which a received CICS request will timeout, or whether to let the UR continue and commit when the number of records processed reaches the maxval value. If the transactional VSAM engine identifies that the timeout will occur prior to the UR being committed, by reaching the maximum number of record access requests, the transactional VSAM engine will flag the UR so that before the next request issued for the same UR is executed, the TVS will perform the automatic commit on behalf of the batch application. As described previously, in response to an early (before the maxval is reached) commit being performed, the transactional VSAM engine will only issue the commit in response to the minval having been reached, in the event that a minval is specified, otherwise the transactional VSAM engine will issue the commit immediately or as soon as possible given the operating conditions.

In one example, assuming that TVSAMCOM=(,100), the commit is issued as soon as contention is detected and also in response to 100 records having been processed. In another example, assuming that TVSAMCOM=(1,), and assuming that there is no maxval specified, the UR will be committed in response to the transactional VSAM engine finding or discovering that a CICS request is waiting for a record lock. In one embodiment, this feature may be disabled in response to the TVSAMCOM values both being set to 0, i.e., TVSAMCOM=(0,0).

According to one embodiment, a commit may be triggered in response to a data set being closed, in which case the transactional VSAM engine will commit the UR associated with the task control block (TCB) issuing the close. By doing this, the TVS warrantees that no record locks are held after the data set is closed.

In another embodiment, a commit may be triggered in response to the batch application obtaining record locks and no automatic commits being issued by the transactional VSAM engine. This commit may be issued because there are no waiters for the records underlying the various record locks held by the UR or the value(s) specified in the TVSAMCOM parameter is never reached, and therefore it is possible that the lock structure that stores the record lock information will become full before the number of records processed reaches the maxval to trigger a commit. In this case TVS will force an auto commit to release the record locks held by the batch application and empty the lock structure when a threshold is met, which may be time-based, quantity-based, or based on some other measurable parameter. This threshold may be set by an administrator, or a default value may be used, such as 75% full, 80% full, 90% full, etc.

According to one embodiment, to perform the commit syncpoint, the transactional VSAM engine will invoke the ATRCMIT or ATR4CMIT RRS macro to indicate that the changes for the UR are to be made permanent. After this point, everything works exactly as if the batch application was the one issuing the SSRCMIT (COMMIT_UR) RRS function. RRS will request to all resource managers to make the changes for the UR permanent.

The RRS ATRCMIT call will be made from the SMSVSAM address space in cross memory mode under the users TCB. In this way, RRS is able to recognize the TCB performing the commit and the UR associated with it. Before the commit starts, the transactional VSAM engine will wait for any inflight asynchronous requests to finish. This will guarantee that all the requests associated with the UR are committed. When a commit is being performed, the TCB will wait until the commit finishes so no new requests will be allowed. In case of any commit failures, the UR will be flagged, an error is returned to the user, and the batch application will back out the transaction and retry in order to make the commit happen.

According to several embodiments described herein, automatic commits may be executed in a data storage environment to clear up record locks on behalf of batch applications that do not perform explicit commits. These record locks may be preventing subsequent transactions from taking place. The decision on when and whether to commit the record locks (and thereby release the associated records for processing) may be based on parameters specified by one or more users and/or a specific workload of the data storage environment and resources thereof.

Moreover, in embodiments described herein, applications do not need to be modified or updated to add explicit syncpoints to commit record locks created thereby. This advantage benefits applications being executed on data storage systems which are too cumbersome, too expensive, too massive, too time-consuming, or otherwise impractical to have changes made to applications executing thereon, such as because an administrator of the application or data storage system lacks source code to make such changes.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an ASIC, a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a CPU, an integrated circuit (IC), a graphics processing unit (GPU), etc.

It will be clear that the various features of the foregoing systems and/or methodologies may be combined in any way, creating a plurality of combinations from the descriptions presented above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving, at a job control manager of a data system, a command specifying execution of a batch application that processes a group of records;
   receiving, at the job control manager, a commit count associated with the batch application, where the commit count is a positive integer n that indicates a number of records to process by the batch application prior to committing record locks associated with the group of records;
   locking a plurality of records within the group of records in response to the processing of the plurality of records by the batch application;
   in response to determining that the batch application has completed processing at least a minimum number of records of the group of records that is less than the commit count, and that a quantity of record lock requests exceeds a threshold, performing an early committing of the plurality of records within the group of records that are locked resulting from execution of the batch application;

receiving, at the job control manager, a second command specifying execution of a second batch application, wherein the second batch application processes a second group of records;

receiving, at the job control manager, a second commit count associated with the second batch application, where the second commit count is a positive integer m that indicates a number of records to process by the batch application prior to committing record locks associated with the second group of records;

locking a second plurality of records within the second group of records in response to the processing of the second plurality of records by the second batch application;

comparing timeouts for all pending record lock requests due to the batch application processing the second group of records;

selecting a timeout that will occur in the least amount of time as a shortest timeout; and in response to determining that the quantity of record lock requests will not be processed prior to the shortest timeout after completing the processing of the mth record of the second group of records, disrupting a processing of the second group of records, including committing the second plurality of all records of the second group of records that are locked resulting from execution of the second batch application prior to determining that the batch application has completed processing of the number of records of the second group of records that equals the second commit count.

2. The method as recited in claim 1, further comprising:
tracking the quantity of record lock requests that are pending execution due to the batch application processing the group of records.

3. The method as recited in claim 1, wherein the record lock requests each include a request for access to a resource resulting in issuance of a record lock on one or more specific records, where for each record lock request:
the record lock request is pending and is unable to be fulfilled due to contention with the record lock held by the batch application, and
the record lock request has a timeout value that dictates when the record lock request expires if the associated record lock is not processed prior to the timeout value.

4. The method as recited in claim 1, wherein the threshold is an integer value greater than one.

5. The method as recited in claim 1, further comprising:
determining an amount of time that elapses from initiating the batch application to committing the plurality of records within the group of records that are locked resulting from execution of the batch application.

6. The method as recited in claim 5, wherein the amount of time that elapses from initiating the batch application to committing the plurality of records within the group of records that are locked resulting from execution of the batch application is determined in response to determining that both:
the number of records within the group of records that have been processed equals the commit count, and
no pending record locks have been discovered for any records in the group of records after initiating the batch application.

7. The method as recited in claim 1, wherein the commit count includes:
a minimum number of records to be processed prior to performing a commit; and
a maximum number of records to be processed prior to performing the commit,
wherein the quantity of record lock requests that are pending execution due to the batch application processing the group of records is not tracked in response to determining that the minimum number of records to be processed prior to the commit is equal to the maximum number of records to be processed prior to the commit.

8. A computer program product, the computer program product comprising a computer readable storage medium having program instructions embodied therewith, wherein the computer readable storage medium is not a transitory signal per se, the embodied program instructions being executable by a processing circuit to cause the processing circuit to:
receive, by the processing circuit at a job control manager of a data system, a command specifying execution of a batch application that processes a group of records;
receive, by the processing circuit at the job control manager, a commit count associated with the batch application, where the commit count is a positive integer n that indicates a number of records to process by the batch application prior to committing record locks associated with the group of records;
lock, by the processing circuit, a plurality of records within the group of records in response to the processing of the plurality of records by the batch application;
in response to determining that the batch application has completed processing at least a minimum number of records of the group of records that is less than the commit count, and that a quantity of record lock requests exceeds a threshold, performing an early committing of, by the processing circuit, the plurality of records within the group of records that are locked resulting from execution of the batch application;
receive, by the processing circuit at the job control manager, a second command specifying execution of a second batch application, wherein the second batch application processes a second group of records;
receive, by the processing circuit at the job control manager, a second commit count associated with the second batch application, where the second commit count is a positive integer m that indicates a number of records to process by the batch application prior to committing record locks associated with the second group of records;
lock, by the processing circuit, a second plurality of records within the second group of records in response to the processing of the second plurality of records by the second batch application;
compare, by the processing circuit, timeouts for all pending record lock requests due to the batch application processing the second group of records;
select, by the processing circuit, a timeout that will occur in the least amount of time as a shortest timeout; and
in response to determining that the quantity of record lock requests will not be processed prior to the shortest timeout after completing the processing of the mth record of the second group of records, disrupt, by the processing circuit, a processing of the second group of records, including committing the second plurality of all records of the second group of records that are locked resulting from execution of the second batch application prior to determining that the batch application has completed processing of the number of records of the second group of records that equals the second commit count.

9. The computer program product as recited in claim 8, wherein the embodied program instructions are further executable by the processing circuit to cause the processing circuit to:
  track, by the processing circuit, the quantity of record lock requests that are pending execution due to the batch application processing the group of records.

10. The computer program product as recited in claim 8, wherein the record lock requests each include a request for access to a resource resulting in issuance of a record lock on one or more specific records, where for each record lock request:
  the record lock request is pending and is unable to be fulfilled due to contention with the record lock held by the batch application, and
  the record lock request has a timeout value that dictates when the record lock request expires if the associated record lock is not processed prior to the timeout value.

11. The computer program product as recited in claim 8, wherein the embodied program instructions are further executable by the processing circuit to cause the processing circuit to:
  track, by the processing circuit, the quantity of record lock requests that are pending execution due to the batch application processing the second group of records;
  in response to determining that the batch application has completed processing of a number of records of the second group of records that equals the second commit count, and determining that the quantity of record lock requests will be processed prior to a shortest timeout thereof after completing processing of the number of records that equals the second commit count, commit, by the processing circuit, the second plurality of records within the second group of records that are locked resulting from execution of the second batch application; and
  in response to determining that the quantity of record lock requests will not be processed prior to the shortest timeout thereof after completing the processing of the number of records that equals the second commit count, commit, by the processing circuit, the second plurality of all records of the second group of records that are locked resulting from execution of the second batch application prior to determining that the batch application has completed processing of the number of records of the second group of records that equals the second commit count.

12. The computer program product as recited in claim 11, wherein the amount of time that elapses from initiating the batch application to committing the plurality of records within the group of records that are locked resulting from execution of the batch application is determined in response to determining that both:
  the number of records within the group of records that have been processed equals the commit count, and
  no pending record locks have been discovered for any records in the group of records after initiating the batch application.

13. The computer program product as recited in claim 8, wherein the commit count includes:
  a minimum number of records to be processed prior to performing a commit; and
  a maximum number of records to be processed prior to performing the commit,
  wherein the quantity of record lock requests that are pending execution due to the batch application processing the group of records is not tracked in response to determining that the minimum number of records to be processed prior to the commit is equal to the maximum number of records to be processed prior to the commit.

14. A system, comprising:
a processing circuit;
a memory; and
logic stored to the memory, that when executed by the processing circuit causes the processing circuit to:
  receive, at a job control manager of a data system, a command specifying execution of a batch application that processes a group of records;
  receive, at the job control manager, a commit count associated with the batch application, where the commit count is a positive integer n that indicates a number of records to process by the batch application prior to committing record locks associated with the group of records;
  lock a plurality of records within the group of records in response to the processing of the plurality of records by the batch application;
  in response to determining that the batch application has completed processing at least a minimum number of records of the group of records that is less than the commit count, and that a quantity of record lock requests exceeds a threshold, perform an early commit of the plurality of records within the group of records that are locked resulting from execution of the batch application;
  receive, at the job control manager, a second command specifying execution of a second batch application, wherein the second batch application processes a second group of records;
  receive, at the job control manager, a second commit count associated with the second batch application, where the second commit count is a positive integer m that indicates a number of records to process by the batch application prior to committing record locks associated with the second group of records;
  lock a second plurality of records within the second group of records in response to the processing of the second plurality of records by the second batch application;
  compare timeouts for all pending record lock requests due to the batch application processing the second group of records;
  select a timeout that will occur in the least amount of time as a shortest timeout; and
  in response to determining that the quantity of record lock requests will not be processed prior to the shortest timeout after completing the processing of the mth record of the second group of records, disrupt a processing of the second group of records, including committing the second plurality of all records of the second group of records that are locked resulting from execution of the second batch application prior to determining that the batch application has completed processing of the number of records of the second group of records that equals the second commit count.

15. The system as recited in claim 14, wherein the logic further causes the processing circuit to:
track the quantity of record lock requests that are pending execution due to the batch application processing the group of records.

16. The system as recited in claim 14, wherein the record lock requests each include a request for access to a resource resulting in issuance of a record lock on one or more specific records, where for each record lock request:
the record lock request is pending and is unable to be fulfilled due to contention with the record lock held by the batch application, and
the record lock request has a timeout value that dictates when the record lock request expires if the associated record lock is not processed prior to the timeout value.

17. The system as recited in claim 14, wherein the logic further causes the processing circuit to:
track the quantity of record lock requests that are pending execution due to the batch application processing the second group of records;
in response to determining that the batch application has completed processing of a number of records of the second group of records that equals the second commit count, and determining that the quantity of record lock requests will be processed prior to a shortest timeout thereof after completing processing of the number of records that equals the second commit count, commit the second plurality of records within the second group of records that are locked resulting from execution of the second batch application; and
in response to determining that the quantity of record lock requests will not be processed prior to the shortest timeout thereof after completing the processing of the number of records that equals the second commit count, commit the second plurality of records of the second group of records that are locked resulting from execution of the second batch application prior to determining that the batch application has completed processing of the number of records of the second group of records that equals the second commit count.

18. The system as recited in claim 17, wherein the logic further causes the processing circuit to:
in response to determining that:
the batch application has completed processing at least a minimum number of records of the group of records, and
the quantity of record lock requests exceeds a threshold,
commit the plurality of records within the group of records that are locked resulting from execution of the batch application,
wherein the minimum number of records is less than the commit count.

19. The system as recited in claim 14, wherein the commit count includes:
a minimum number of records to be processed prior to performing a commit; and
a maximum number of records to be processed prior to performing the commit,
wherein the quantity of record lock requests that are pending execution due to the batch application processing the group of records is not tracked in response to determining that the minimum number of records to be processed prior to the commit is equal to the maximum number of records to be processed prior to the commit.

\* \* \* \* \*